United States Patent [19]

Gantenbein et al.

[11] Patent Number: 4,809,257

[45] Date of Patent: Feb. 28, 1989

[54] HIERARCHICAL DISTRIBUTED INFRARED COMMUNICATION SYSTEM

[75] Inventors: Dieter Gantenbein, Adliswil, Switzerland; Fritz R. Gfeller, Ossining, N.Y.; Eduard P. Mumprecht, Meilen, Switzerland

[73] Assignee: International Business Machines Corporation, Armonk, N.Y.

[21] Appl. No.: 844,436

[22] Filed: Mar. 26, 1986

[30] Foreign Application Priority Data

Apr. 2, 1985 [EP] European Pat. Off. ....... 85 103928.9

[51] Int. Cl.⁴ .............................................. H04B 9/00
[52] U.S. Cl. ...................................... 370/4; 455/601; 455/607
[58] Field of Search ............... 455/606, 607, 601, 617, 455/618, 619; 370/4

[56] References Cited

U.S. PATENT DOCUMENTS 4,090,067 5/1978 Bell, III et al. .................... 455/601
4,402,090 8/1983 Gfeller et al. ........................... 370/4

FOREIGN PATENT DOCUMENTS 0054582 6/1982 European Pat. Off. .
2431937 1/1976 Fed. Rep. of Germany .

OTHER PUBLICATIONS

Vol. 67, No. 11, Nov. 1979, Proceedings of the IEEE, Wireless In-House Data Communication Via Diffuse Infrared Radiation by F. Gfeller, U. Bapst.
Vol. 24, No. 8, Jan. 1982, IBM Technical Disclosure Bulletin, Infrared Microbroadcasting Network for In--House Data Communications by F. Gfeller.
Vol. Lt-3, No. 1, Feb. 1985, Journal of Lightwave Technology, Passive Optical Star Bus With Collision Detection for CSMA/CD-Based Local Area Networks by S. Moustakas, H. Witte and V. Kulich.
Vol. 25, No. 8, Jan. 1983, IBM Technical Disclosure Bulletin, Minicomputer System Components Interconnected Via a Serial Infrared Link, by F. Gfeller and E. Mumprecht.
IEEE STD. 8023, CSMA/CD, 1985 pp. 138-139.
Local Area Networks: CSMA/CD Access Method and Physical Layer Specifications Fontenay, Electron. & Appl. Ind. "Infrared Communications for Data Processing".
Gfeller et al, Proceeds of IEEE, vol. 67, #11, "Wireless Data Communication via Diffuse Infrared Radiation".

Primary Examiner—Robert L. Griffin
Assistant Examiner—Leslie Van Beek
Attorney, Agent, or Firm—George E. Grosser; Philip R. Wadsworth

[57] ABSTRACT

In an infrared communication system in which many units of different requirements can communicate with each other, transceivers are assigned to different categories, each with its own transmitting power and receiving sensitivity depending on the required distance range. This allows simultaneous independent infrared communications in different local areas between low power/sensitivity devices but enables also transmission over larger distances or over the whole system between larger power/sensitivity devices. Depending on the power/sensitivity relation and distance, a potential receiver may either be able to decode data signals correctly, or it may be only able to detect the presence of a carrier. To allow a clear access protocol in all cases, a unit gets two chances to reenter access competition after having sensed the carrier: Either upon decoding a data end delimiter, or upon a timeout equal to the longest possible packet transmission time. A mixed-media network is obtained by attaching, via respective interface units, subnetworks in which units are interconnected by cables but use the same access protocol as the IR interconnected units.

17 Claims, 11 Drawing Sheets

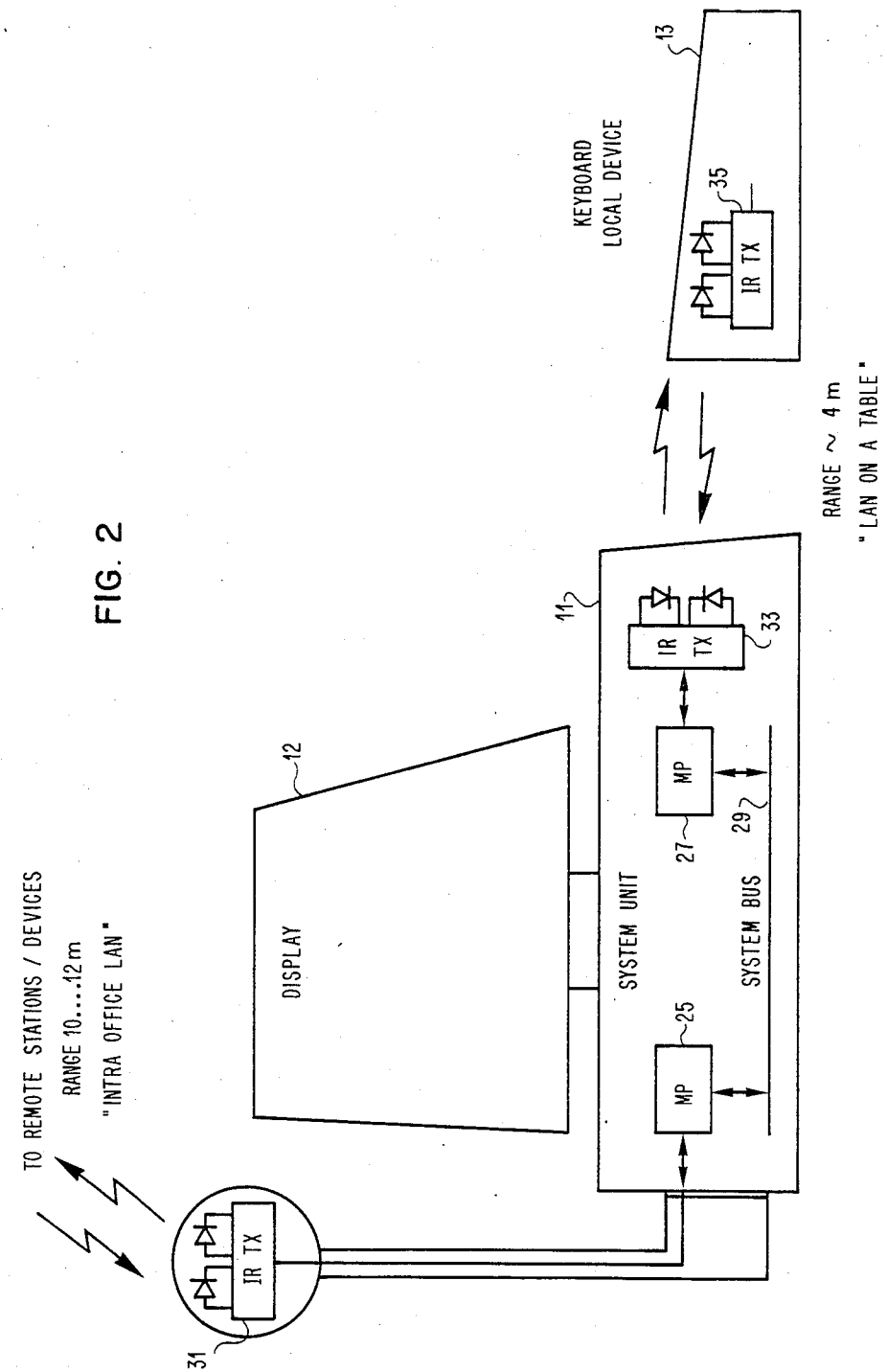

HIERARCHICAL DISTRIBUTED INFRARED COMMUNICATION SYSTEM

BACKGROUND OF THE INVENTION

The present invention is related to communication systems, and more particularly to a communication system interconnecting data transmitting and receiving units by infrared signals, and to a method of transmitting data in a system comprising a plurality of units including stations and associated devices.

The use of infrared signals for exchanging information between devices has received increased interest during recent years. The advantage of such systems is the elimination of special signal transmitting media such as wires. With respect to radio frequency (RF) transmission, infrared (IR) transmission has the advantages that no communication regulations apply and no PTT or FCC license is required, no disturbance by EMI and no interference from other RF channels can occur, and the radiation is confined to a room so that better data security is available than with RF systems.

Several IR transmission systems were described in the literature and disclosed in patents.

An article by F. Gfeller and U. Bapst entitled "Wireless In-House Data Communication via Diffuse Infrared Radiation", published in Proceedings of the IEEE, Vol. 67, No. 11, Nov. 1979, pp. 1474–1486 describes a communication network in which data are transferred between a plurality of terminals and a host computer. Each room in which terminals are located comprises a satellite station which receives IR signals from and distributes IR signals to the terminals. All satellites are connected to the host by an electrical wire network. No direct communication between terminals is provided.

In U.S. Pat. No. 4,402,090 entitled "Communication System in which Data are Transferred Between Terminal Stations and Satellite Stations by Infrared Signals", as well as in an article by F. Gfeller "Infranet: Infrared Microbroadcasting Network for In-House Data Communication", published in Proceedings, 7th European Conference on Optical Communications, Sept. 1981, pp. P27-1 –P27-4, a similar system is described which however provides a plurality of satellite stations for a large room to enable coverage of the larger area which is not possible with a single satellite. Though this prior art solves the problem of possible multiple reception of the same message via the IR channel, it does not provide for direct communication between the terminal stations.

With the rapidly increasing number of intelligent workstations and personal computers in all areas of business, administration, etc. there is also an increasing need for connecting I/O devices such as keyboards, displays, printers to them, and for interconnecting such workstations and small computers to each other. The use of electrical wire networks becomes a problem in particular with high density of stations and in the many cases where the location of stations or the configuration of subsystems must be changed frequently. It is therefore desirable to use IR signal transmission for interconnecting such devices and workstations to eliminate the requirement of electrical cable networks.

A problem, however, is the possible mutual interference of infrared signals if several connections are to be maintained simultaneously which is necessary e.g. in a large office environment. Frequency multiplexing is not possible because there is not enough bandwidth so that all devices must use the same baseband channel.

SUMMARY OF THE INVENTION

According to the invention, transceivers of data transmitting and receiving units are assigned to different categories having a hierarchical scale of transmission power and receiving sensitivity, so that some data transmissions are only effective in close neighborhood thus allowing simultaneous transmission in different local regions, whereas also data communications from one end of the system to the other are possible. To allow orderly access even if data of an ongoing transmission are not correctly received, each unit that detected a preamble carrier signal preceding each packet transmission observes a time-out and simultaneously tries to decode received data signals and their end delimiter so as to have at least one of two possible bases for establishing a reference point for a subsequent attempt to access the transmission medium, without interfering with an ongoing transmission. The provision of selecting or enabling bits in each transmission frame allows for selective activation (or inhibition) of units that may be receiving the frame but should not use or forward it.

The IR transmission network architecture introduced by the invention supports slow, battery-powered devices as well as fast, balance-mode communication between workstations. All kinds of stations and devices can use the infrared channel in a common way.

It is an object of the invention to provide a communication system exchanging information between several data handling units, which is based on infrared signal transmission and allows efficient data traffic despite a great number of participating stations.

It is another object to device an IR local communication network that allows an orderly access to the infrared transmission medium even if the transmitted IR signals that are received by any unit from different devices or stations are of considerably different strength.

Another object of this invention is an IR communication system that allows selective paths or configurations to be established by device selection to avoid the distribution of IR signals representing data packets to units where they are not required to go thus reducing the changes of interference between different communication sessions.

It is a further object to provide an IR communication network design that allows interconnection of a large number of workstations and I/O devices of different capabilities, distributed over an extended area, with a minimum in mutual disturbance.

It is a further object to provide a communication system which can exchange data between several data handling units, providing above mentioned features and which uses for the transmission of data signals either the infrared medium exclusively or mixed media including cables, so that some units may be interconnected by infrared means and others by wires, depending on the transmission distance and other considerations.

BRIEF DESCRIPTION OF THE DRAWINGS

An embodiment of the invention is described in the following detailed description and will more clearly present in connection with the accompanying drawings the different features and advantages of the invention.

FIG. 2 schematically shows a workstation and its transceivers that are used in the preferred embodiment of the present invention;

DETAILED DESCRIPTION OF THE PREFERRED EMBODIMENT

There are several possibilities for the integration of workstations into a single IR network, as shown in the different parts of FIG. 1.

Figure 1A:
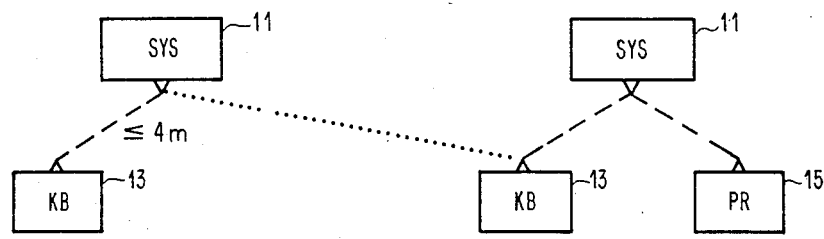
FIGS. 1A-1D illustrate the different possible configurations of an IR communication network utilizing the present invention.

FIG. 1A shows two independent workstations each consisting of a system unit 11 and one or several peripheral devices 13, 15. Keyboards 13 (KB) and printers 15 (PR) are connected to the respective system units 11 (SYS) cordless via infrared (IR) signals. Workstations can have several IR-attached peripheral devices at a time, e.g. keyboards, mice (pointing devices), printers, and displays. The workstations operate independently of each other. Nevertheless, IR interferences can occur if they are too close to each other. Such an interference between a keyboard and a system unit is drawn in FIG. 1A as a dotted line. Key requirements for IR-attached keyboards are low cost and low power consumption (because they are battery-powered). In order to reduce interferences between workstations, both local devices and system units have low-range transceivers.

Figure 1B:
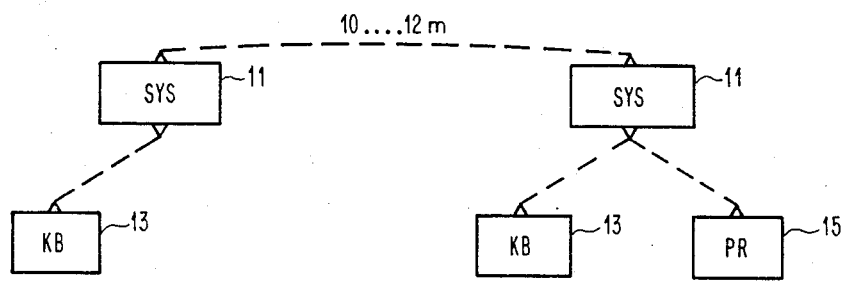

Workstations that want to communicate with each other need a transceiver with more optical power as shown in FIG. 1B. Such a transceiver can be installed as an option in each system unit 11. Alternatively, a single high power transmitter is installed but powered with two different power levels, according to communication requirements.

Figure 1C:
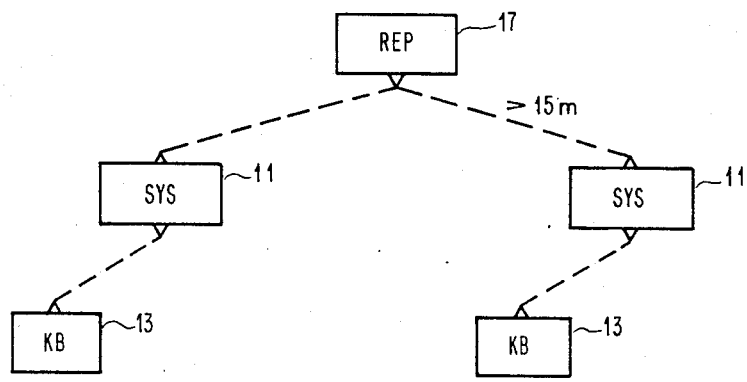

Workstations that are too far away from each other cannot communicate directly. FIG. 1C shows a possible solution for this problem, in which an asynchronous repeater 17 (REP) is provided which forwards traffic between stations. Several repeaters could be used for covering larger areas.

Figure 1D:
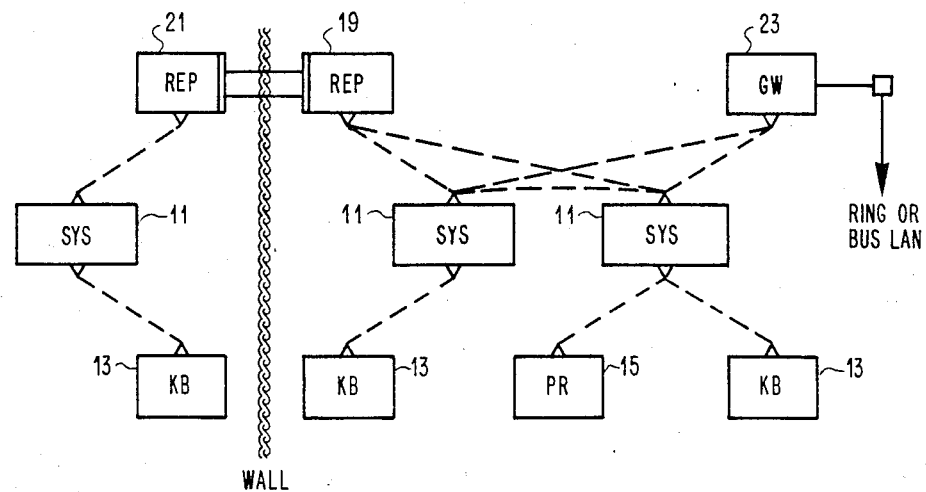

FIG. 1D shows a system with a back-to-back pair of special repeaters 19, 21 which forward traffic through a wall. A similar setup can be used for a gateway 23 to another network, e.g. to a ring or a bus local area network, or any other cable-bound subnetwork comprising one or several workstations.

Of course, any one of the IR connections shown in FIGS. 1A-1D could be replaced by a wire connection if that is desirable and advantageous.

A possibile assembly of system unit 11 with a display unit 12 and one keyboard 13 is shown in FIG. 2. The system unit comprises two microprocessors 25, 27 (MP) interconnected by a system bus 29. A transceiver 31 for exchanging IR signals with other workstations or with a repeater is connected to microprocessor 27. Both IR transceivers 31 and 33 within the system unit are independently addressable, from the microprocessors as well as from the IR network.

In a mixed media system, transceivers 33 and 35 could be replaced by cable transceivers for interconnecting the device to its system unit by cable, or transceiver 31 could be replaced by a cable transceiver to allow interconnection of several system units by a cable bus.

Keyboard 13 (as well as each other local peripheral device) comprises a transceiver 35 for exchanging IR signals with the system unit transceiver 33.

Figure 3:
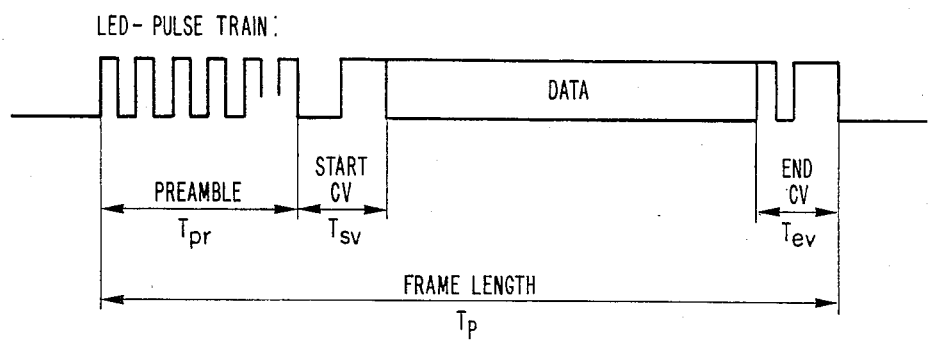
FIG. 3 shows the frame format used for packet transmission in the IR network of the present invention.

The structure of the basic frame format of the present invention is shown in FIG. 3. Manchester coding is used for data transmission over the IR channel. A preamble consisting of a sequence of alternating ones and zeroes (at least five ones) serves to settle the analog front-end of the receiver to its equilibrium state and also indicates the presence of a carrier. More generally, the preamble is a sequence of rectangular pulses of 50% duty cycle emitted at Manchester bit rate. Carrier in this specification means the presence of a transmission on the ether, i.e. in the infrared transmission "channel". The synchronization pulse start delimiter consists of three consecutive zeros followed by three consecutive ones and is interpreted as a code violation and is therefore transparent. The subsequent data bits are encoded in Manchester code (i.e. each data bit being represented by a 0/1 or 1/0 pair of half-bits) which facilitates clock extraction and allows accoupling. (Another possible candidate is pulse position coding.) The data packet format is described in detail later hereinafter. The end of the transmission is signaled by the end delimiter code violation which is different from the start delimiter code violation. It allows for determination of the end of a packet, and is a synchronization event to start counting access slots.

Investigations have shown that the diffuse IR channel has a bandwidth of approximately 10 MHz (restriction due to multiple optical paths of different lengths). In practice, however, the transmission speed is limited to 1 MBit/s due to the limited modulation capability of high output power, low-cost light emitting diodes (LEDs). The wide-spread use of such LEDs (TV remote control and the like) has rendered a very low production cost. Another restriction is given when microprocessors with slow serial input and output ports are used. For the present embodiment, a data rate of 375 kBit/s was selected. However, the possible data rate of 1MBit/s could be utilized if buffers are provided at the I/O ports, or if microprocessors with faster I/O ports are provided.

The packets are emitted in short bursts of up to 128 data bytes resulting in transmission durations of 2 to 4 milliseconds maximum. This allows the LEDs to be driven with current pulses up to 2A. The thermal time constant of an LED is approximately 2 to 3 ms, thus preventing overheating of the junction. For repetitive packet transmission, the packets are transmitted with a duty cycle of 10% to allow cooling of the LED. The interval between packets of maximum length is therefore 20 ms to 40 ms. During these intervals other stations may contend for access to the IR channel. The sustained data rate between stations is therefore 37.5 kBit/s (minus protocol overhead) for the 375 kBit/s speed and up to 100 kBit/s for the maximum speed for 1 MBit/s.

The different configurations of the infrared transmission network given before (FIG. 1) specify three physical transmission ranges. The first range is known as "LAN on a Table" and is allocated to the peripheral input/output devices which normally have to be within close range of the system unit of the workstation, such as keyboards, joy-sticks, touch panels. The display unit can also be allocated to this class. The indirect (diffuse) range is approximately 2-4 m, with direct line-of-sight transmission up to 8 m. The optical transducer requirements per transceiver are 2 LEDs and 2 Photodiodes.

The second range (indirect 10-12 m) is known as "Intra Office LAN" and is allocated to peripheral devices which need not (or should not) be close to the system unit of the workstation. Printers, plotters, and other input or output devices are examples. This range should cover medium sized office rooms without repeaters. The transceivers could be plugged in as separate units at the back of the device (as shown for the system unit in FIG. 2). The optical transducer requirements per transceiver are 12 LEDs and 4 Photodiodes.

The third range is known as "Intra Office LAN with Repeaters" and is typically used in a classroom or auditorium environment. A repeater may have a transmission (and receiving) radius of more than 15 m. The repeater has a separate power supply, standing on a desk or mounted on a wall or ceiling. Alternatively, the repeater function can be incorporated in a system unit to save the extra cost for separate housing and power supply. Several repeaters may be used to cover open space large office areas measuring 30×30 m. Alternatively, cluttered office spaces and low partition walls may require multipath transmission via several repeaters to access "hidden" stations. The optical transducer requirements per transceiver are N×24 LEDs (arranged in a circular array) and 12 Photodiodes. The factor N refers to the fact that the packet duty cycle for repeaters is 50% since in the interest of an optimally used channel capacity they have to retransmit received packets immediately. In practice N=2-3.

The numbers indicated for LEDs and photodiodes are approximate and refer to a transmission speed of 375 kBit/s under daylight (no direct sun light on photodiodes) or fluorescent lighting conditions. Each LED will emit approximately 250 mWatt peak power and the sensitive area of each photodiode is approximately 10 mm². The transducers of the "Intra Office LAN" type, i.e. workstation transceivers, must be flexibly mounted to allow their beams pointing towards the interior of the office. The ranges referred to correspond to the "D-boundaries" (see following section), i.e. they are physical domains.

The IR channel is more complex than a bus. The characteristics of transceivers and medium cannot guarantee that each pair of devices can communicate. Nevertheless, a global addressing scheme is required.

Figure 4:
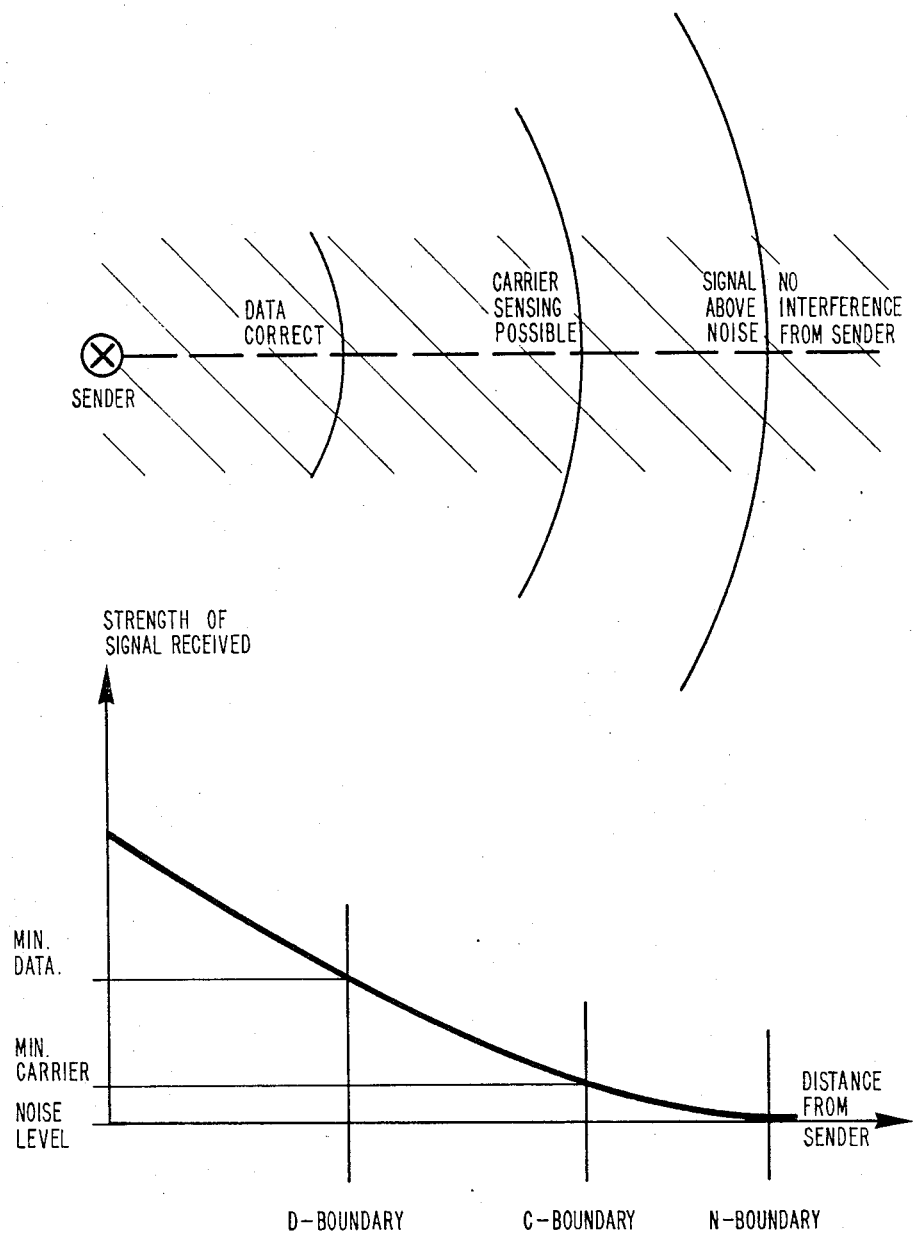
FIG. 4 illustrates the transmission model with different ranges that are distinguished in a system using the present invention.

FIG. 4 schematically shows the different levels of direct reachability that can occur between a sender and a potential corresponding receiver device. (Generally, the scale, i.e. the radius of the ranges, depends on both, the sender power and the receiver sensitivity). For example, a receiver inside the D-boundary (data boundary) can fully recognize/decode the data signal and thus can receive data frames correctly. The end of transmission (end delimiter) is safely detectable within this range. A receiver between the D-boundary and C-boundary (carrier boundary) can just sense the carrier (i.e. the preamble), but not correctly decode data. In particular, the end of transmission end delimiter cannot be detected. A receiver between the C-boundary and N-boundary (noise level boundary) cannot sense the preamble correctly. However, the signal is still above the noise level and may cause interference with other ongoing transmission. The sender cannot interfere with stations outside the N-boundary because in this range its signal is at or below noise level.

Devices that want to talk to each other have to be within the D-boundaries of each other. Devices outside their respective D-boundaries cannot communicate, but may still cause mutual interference as long as they are within their respective N-boundaries.

Two senders transmitting at the same time can cause a collision. On a cable-bound medium this would inevitably result in both packets being destroyed. On the IR medium this is not necessarily the case. The stronger signal will override the weaker signal provided that the stronger signal is at least 20 dB(el) above the weaker one. The receiver and decoding circuitry will respond correctly to the stronger synchronization pattern and lock to the forthcoming data stream. Depending on the relative location of the two actual transmitters and their two respective addressed receivers three situations may occur: Both packets are saved, one packet only is saved, or both packets are destroyed. No collision detection is provided in this system. The loss of packets will be detected by error control procedures in a higher level protocol.

The transceivers of local devices have to be specified with the shortest possible transmission range. This avoids excessive interference at other workstations and preserves their share of the IR bandwidth. If communication partners are not powerful enough to be in their respective D-boundaries, repeaters have to be installed.

Figure 5:
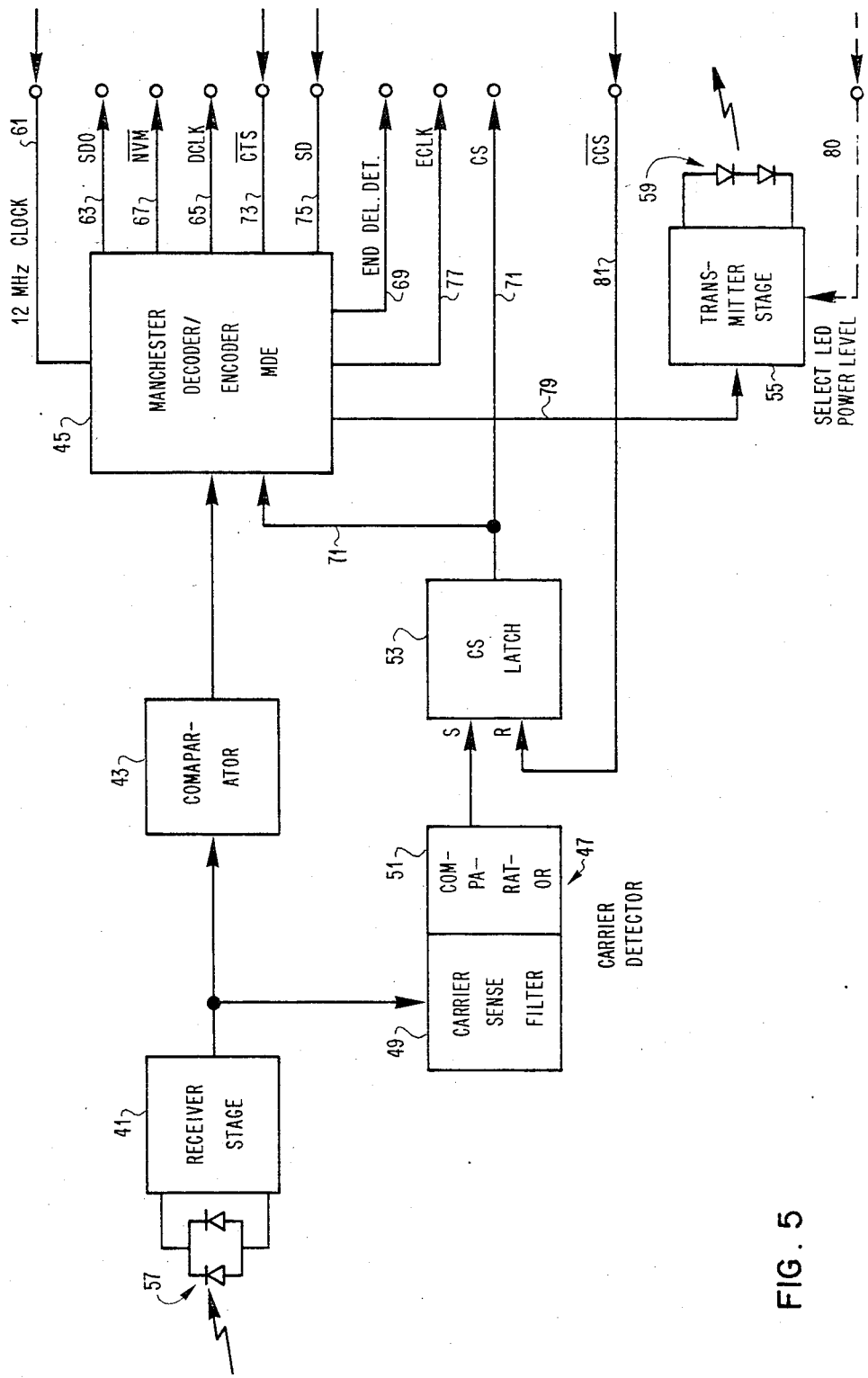
FIG. 5 is a block diagram of an infrared transceiver used in the preferred embodimentof the preferred invention.

A basic infrared transceiver circuit with receiver stage 41, comparator 43, Manchester decoder/encoder (MDE) 45, carrier detector 47 comprising carrier sense filter 49 and threshold comparator 51, carrier sense latch (CS latch) 53, and transmitter stage 55 is shown as block diagram in FIG. 5. Photodiodes 57 are provided at the input of receiver stage 41, and light emitting diodes (LEDs) 59 are provided at the output of transmitter stage 55. For all types of transceiver ranges, the circuits are identical apart from modular expansions for additional optical transducers (additional receiver and-/or transmitter stages). Additional photodiodes can be connected to the receiver stage via isolating front-end circuits. Similarly, driver circuits for additional LEDs can be provided at the transmitter stage.

On the right side of FIG. 5, there are shown the interface lines by which the transceiver is connected to the system unit (or I/O device, respectively).

The same transceiver circuit arrangement could be used for units in a cable-bound subnetwork that is connected to an IR transmission network (as was mentioned in section 1), except that IR receiver state 41 with photodiodes 57 and transmitter stage 55 with LEDs 59 would be replaced by a cable receiver and a cable driver, respectively.

For large area photodiodes and strong input signal levels (close proximity of transmitter or strong near-field echo) the front-end circuitry in receiver stage 41 may be saturated and therefore inoperational. To counteract this phenomenon a gated gain control responding to the first input pulse without delay can be provided in the receiver stage.

In order to isolate the dc photo-current generated by ambient light and to reject lower frequency ac fluctuations (light intensity fluctuations of fluorescent and incandescent lamps due to the mains frequency and higher harmonics) a first order high pass filter is provided in receiver stage 41.

For Manchester encoding the pole of this filter is located at approximately 12 kHz for the 375 kbit/s speed or 30 kHz for the 1 Mbit/s speed which provides incomplete but acceptable filtering of the "old" 50 Hz fluorescent tubes. In addition, this filter also causes a relatively long recovery time after receiving a packet. The recovery time is especially long for strong near-field echoes. During the recovery time the receiver is not able to receive a weak signal. This requires the definition of a guard time in the access protocol. This guard time Tg (more details will be given in connection with FIG. 8) is approximately 300 microseconds.

Improved filtering for the "new" type of rf fluorescent lamps, which emit weak IR radiation at 30–50 kHz and their harmonic overtones, can be achieved by differentiating the received signal pulses, or by delaying the received signal by T/2 (where T is the bit duration) and comparing it with the undelayed signal.

In conjunction with the latter two filtering methods, the guard time Tg interval can be reduced to approximately 30 $\mu$s by using an automatic gain control circuit.

Comparator 43 compares the output signal of receiver stage 41 to the dc-restored base level and furnishes a TTL logic signal to Manchester decoder/encoder (MDE) 45.

MDE 45 receives a locally generated 12 MHz clock signal on line 61 from the system unit. It furnishes a bit stream representing the received data (SD) on line 63 and a respective receive clock (DCLK) on line 65. If no data can be recognized, a signal "Non-Valid Manchester data received" (-NVM) is activated on line 67. When an end delimiter code violation is detected, a respective indication signal is issued on line 69. The decoding portion of MDE 45 is only enabled when a signal "carrier sensed" (CS) on line 71 is active.

For its encoding function, MDE 45 receives an enabling signal "clear to send" (-CTS) on line 73, and the bit stream of data to be transmitted (SD) on line 75 from the system unit. On line 77, it furnishes a transmit clock (ECLK) for controlling the rate of data transfer from the system unit to the MDE. On line 79, it furnishes the Manchester encoded data (-BZ0) to transmitter stage 55.

MDE 45 issues a pulse on line 69 not only when it received an end delimiter code violation from receiver 41, but also when it furnishes an end delimiter code violation on line 79 to transmitter stage 55 (to ensure proper access timing in any case, as will be explained later).

If a single transceiver is to be used selectively for different transmission power levels (e.g. by either activating all LEDs or only half of them, depending on required range), a respective control signal can be furnished to transmitter stage 55 on an extra interface line 80.

Figure 6:
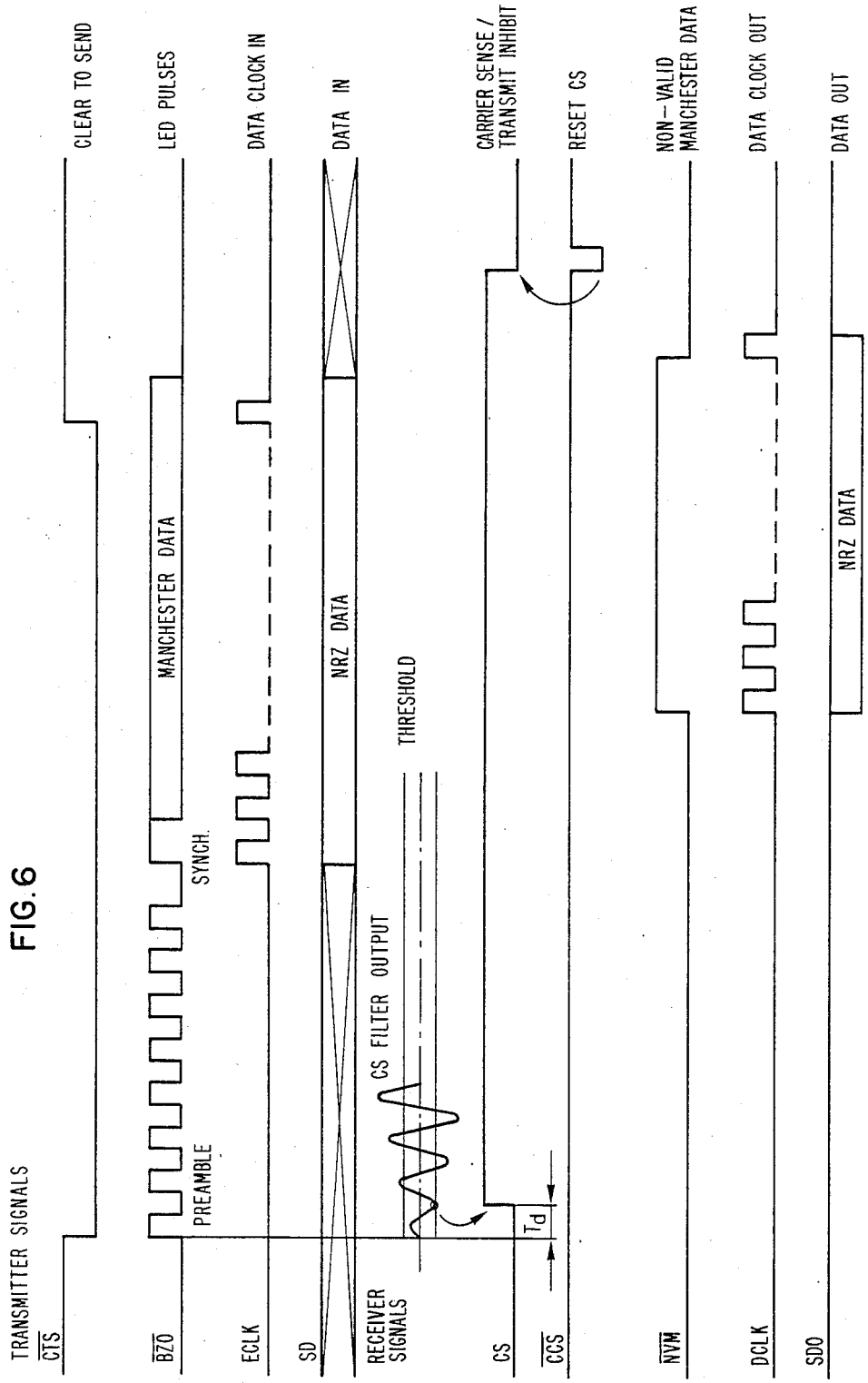
FIG. 6 is a timing diagram of the interface signals that are transmitted to and from the IR transceiver of FIG. 5.

Waveform samples of interface signals that are exchanged between the transceiver and the system unit (or I/O device, respectively) are shown in FIG. 6.

Carrier detector 47 and CS latch 53 serve to give an early warning of the presence of a transmission (carrier sense delay time Td=1–5 microseconds depending on signal strength), and also serve to enable the Manchester decoder. (If the decoder were left enabled during idle periods, noise due to ambient light could occasionally cause wrong decoder outputs.)

Carrier sense filter (bandpass filter) 49 is tuned to the pulse frequency of the preamble that precedes each packet transmission. The output signal of the filter circuit is compared to a threshold amplitude value in comparator 51 which changes its binary output signal only when the filter output exceeds the threshold, i.e. when it can be safely assumed that a carrier (and not only noise) is present (cf. FIG. 6). When the comparator output signal becomes active, it sets carrier sense latch (CS latch) 53 whose output signal CS is furnished on line 71 to the system unit for controlling the access protocol, and also to MDE 45 as an enabling signal. CS latch 53 can only be reset by a respective signal "clear carrier sense" (CCS) on line 81 from the processor of the system unit. Details of the use of carrier sense signal CS in the access protocol will be provided later hereinafter.

Carrier sense bandpass filter 49 can be embodied with operational amplifiers allowing a Q-factor of up to 15. An implementation using a ceramic filter is preferred because of higher Q's attainable and tighter tolerance of the center frequency. The carrier sense detection range (radius of C-boundary) should be as close to the N-boundary as possible, so that the area where collisions can occur (carrier not clearly detectable but above noise) is as small as possible. The relation depends on the bandpass Q-factor, carrier sense delay, and preamble length. The range of zero interference (radius of N-boundary) is approximately 4 times the D-range but depends heavily on orientation and ambient light level.

Figure 7:
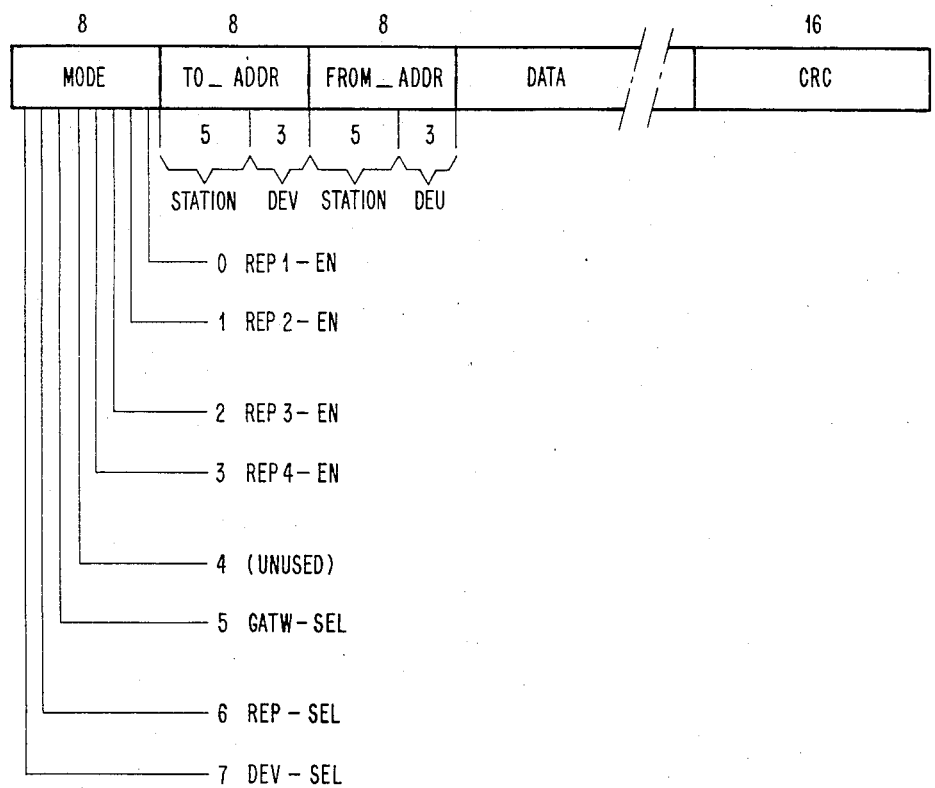
FIG. 7 shows the packet format used for data transmission, including the mode field which accommodates for selecting or enabling specific units in the system of the present invention.

In the IR NETWORK, each data packet is preceded by a preamble and a start delimiter code violation and followed by an end delimiter code violation (see FIG. 3). It has fields for network control, addressing, data, and frame error control as described below and as shown in FIG. 7.

| | |
|---|---|
| MODE: | Eight bits. The mode field controls selective activation of units in the network. It comprises four "select" bits (7 . . . 4) and four "enable" bits (3 . . . 0). The group of normal devices, the repeater (or group of repeaters) and a possible gateway to another network are separately selectable by the select bits to be end-receivers of the frame. Just one of the select bits should be set in general. |
| DEV-SEL: | Bit 7 (MSB). Selects all the devices, i.e. enables them to receive the frame and check the address field. This bit should be set to 1 for normal traffic on the IR network. |
| REP-SEL: | Bit 6. Selects all repeaters. Should be set to zero for all but test |

|  |  |
|---|---|
|  | and configuration traffic that addresses the repeaters directly. The transparent repeater function (store and forward) is controlled by the enable bits described later. |
| GATW-SEL: | Bit 5. Selects the gateway. Should be set to zero for all normal traffic on the IR network. For traffic to a gateway DEV-SEL should be set to 0 and GATW-SEL set to 1. |
| (unused): | Bit 4. To be set to zero in a pure IR system. In a mixed media system (IR and cable bound transmission), this bit may be utilized to select the operating conditions for the medium used (zero for IR medium, one for cable medium). |
|  | To control the forwarding function of multiple repeaters, they can be enabled (activated) on a per frame and per repeater basis by the four enable bits designated REP4-EN (Bit 3), REP3-EN (Bit 2), REP2-EN (Bit 1), and REP1-EN (Bit 0). Each of these bits enables one of four possible repeaters. The repeater enable bits should be set to zero in packets destined for local devices. For normal inter-workstation communication they should all be set to ones. |
| TO-ADDR: | Eight bits. The TO-address field is the full network address of the destination device. |
| FROM-ADDR: | Eight bits. The FROM-address field is the full network address of the originating (sending) device. Both address fields are hierarchically structured into a STATION address and a DEVICE address sub-field: |
|  | STATION: The station field contains the 5 most significant bits. This allows for a maximum of 32 stations on the IR network. |
|  | DEVICE: The device address is to be interpreted local to its workstation. The device field is in the three least significant bits of the address byte. This allows for eight devices per workstation. Device address 0 is reserved for the keyboard. Device address 1 is the system unit. |
| DATA: | 1 ... 128 bytes. The data field might embed a higher level protocol. The data field is split into a one byte control field C and a variable length field I for data. Using HDLC elements of procedures allows for a variety of protocol options. |
| CRC: | 16 bits. The CRC field contains a 16-bit checksum. It covers the fields MODE, TO-ADDR, FROM-ADDR, and the data field. |

Certain well known access protocols such as centralized polling or the token passing method are not feasible for the IR communication network described here.

The proposed access mechanism is CSMA (Carrier Sense Multiple Access) for all stations capable of sensing the carrier. All other stations access the medium randomly (ALOHA) with an increased probability of collisions. High priority units (such as repeaters) have a first group of access slots assigned to them (which may be individually assigned as in slotted CSMA, or which may be used randomly by contention between all high priority units). Lower priority units (such as I/O devices) contend for the IR channel by random CSMA in a second group of slots that is assigned to them.

Figure 8:
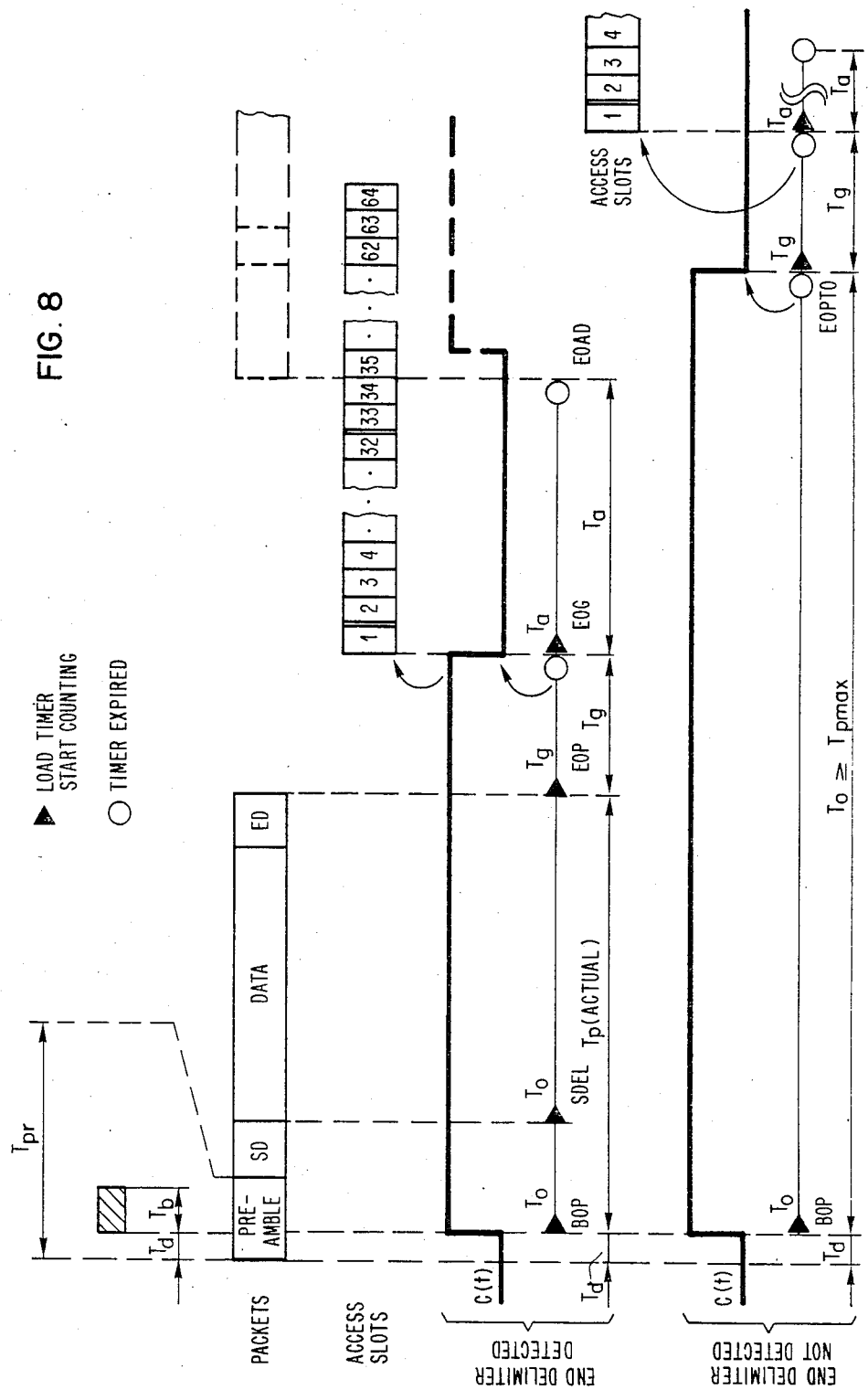
FIG. 8 is a timing diagram illustrating the access protocol introduced by the present invention.

Access delays are illustrated in FIG. 8. The end of a transmission is followed by the guard time interval Tg during which receivers settle to the idle state. A new transmission may only be attempted after the guard time has elapsed.

At the end of guard time Tg a sequence of 64 access slots each of duration Ts begins. Immediately following the guard time in one access slot (No. 1) for enabling start of a packet transmission and acknowledging receipt of the previously transmitted data packet. Thereafter follows the first group of access slots (Nos. 2-32) for the high priority units, which are in turn followed by the second group of access slots (Nos. 33-64) for the lower priority units.

A device which is capable of detecting the end delimiter has a delay any attempt to transmit for the duration of the guard time Tg plus its individual access delay time Ta. A device within the C-boundary but outside the D-boundary of a sender, i.e. a device which cannot recognize the end of a packet transmission, must delay any attempt to transmit for a time equivalent to the longest possible packet transmission Tpmax, plus guard time Tg, plus its individual access delay time Ta.

The various time intervals are as follows:

| | |
|---|---|
| Td = 1 ... 5 microseconds | Carrier sense delay, depending on signal amplitude and filter bandwidth |
| To ≧ Tpmax | Time-out for maximum packet length |
| Tg = ca. 30 ... 300 micro seconds | Guard time, depending on receiving circuit |
| Ts = 5 microseconds | Access slot duration (Ts is of the same order as the carrier sense delay time Td) |
| Ta = N * Ts | Access delay |
| N = 0 | for acknowledgements |
| N = 1 ... 31 | random number within these boundaries for high priority access |
| N = 32 ... 63 | random number within these boundaries for low priority access |

The IR channel can be in three different states, namely IDLE meaning that no infrared signal is present, TRANSMIT meaning that infrared signals are present (emitted by one or several transmitters), and DEFER meaning that after the end of an infrared signal (a packet transmission) transceivers are waiting for individual predetermined intervals before they transmit. The latter state consists of two substates depending on the signal quality (i.e. end delimiter detected=good signal quality, or end delimiter not detected=bad signal quality).

Normally, the channel is in the IDLE state. Transitions between states occur after the following events:

When the channel becomes active the IDLE state is left for the TRANSMIT state. After the end of a transmission the channel becomes inactive again and the state entered is now DEFER. As was mentioned, this state is divided into two substates depending on whether the end of a packet could be detected or not. In this state the stations wait for individual periods of time before transmitting again, or the channel returns to IDLE if the access delays have expired and no station seized the opportunity to transmit.

In the following there are defined all possible events and some of the function states (not to be mistaken for the IR channel states I, R, S, D) that may occur, and their effects on the access protocol. The access protocol is defined here in a formal way using the terminology of finite state machines. Based on this formal description an implementation can be made either in hardware using gate-array technology or in software controlling a microprocessor.

Reference is made to FIG. 8 which shows the protocol events for different situations.

* Carrier Sense Function States

Let the Boolean function C(t) be defined as $$C(t) = \begin{cases} 1 \text{ after carrier was detected} \\ 0 \text{ after reset by an event EOG or EOPTO} \end{cases}$$

The events EOG and EOPTO are defined later.

The Boolean function C(t) is realized in carrier sense latch (CS latch) 53 which is triggered by the output signal of carrier detector 47 of the IR transceiver (FIG. 5). Thus, the function C(t) over time is equal to the waveform of signal CS shown in FIG. 6. The time delay Td is required for the detection operation and is in the order of 5 microseconds maximum for a weak signal. Note that the analog carrier detector 47, due to its tuning to the packet preamble, only provides a trigger signal, not a continuous indication for the presence of a carrier.

* Event BOP (Begin of Packet)

This event is said to occur when C(t) undertakes a transition from 0 to 1. It signals the presence of a carrier in the IR channel. Note that the value C(t)=1 is stored in CS latch 53 even after the signal from the carrier sense filter 49 dropped below threshold.

* Event EOP (End of Packet)

This event is said to occur when the end delimiter of a packet has been detected. End delimiter detection is integrated into the Manchester decoder/encoder 45, and the respective signal indication is available on line 69. Instead of using hardware end delimiter detection, the packet end (and thus the event EOP) could also be detected by software when the CRC check is successfully completed.

The occurrence of this event is taken as the first priority time base to synchronize access delay time slots.

* Event EOG (End of Guard Time)

This event is said to occur when a time-out ends which is started at event EOP and which lasts for the duration of the guard time Tg.

* Event EOPTO (End of Packet Time-Out)

This event is said to occur when the receiving station was unable to detect the end of a packet due to a collision or due to a poor signal/noise ratio causing the receiver PLL to loose synchronization. This event occurs on time-out of a counter loaded with a delay time "To" where To ≧ Tpmax, Tpmax being the maximum packet length.

The occurrence of this event is taken as the second priority time base to synchronize access delay time slots.

* Event SDEL (Start Delimiter Detected)

This event is said to occur when the start delimiter is detected. It is captured when the output signal NVM of Manchester decoder/encoder 45 goes from 0 to 1.

* Event EOAD (End of Access Delay)

This event is said to occur on time-out of a counter loaded with the individually calculated access delay time "Ta".

* Transmission Buffer Function States

The state of the transmit buffer which is provided in each unit or device is defined as follows:

$$Tb(t) = \begin{cases} 1 \text{ if transmit buffer at time } t \text{ is not empty} \\ 0 \text{ if transmit buffer at time } t \text{ is empty} \end{cases}$$

The value of this function is stored in a transmit buffer state latch whose binary output value can be regarded as a transmit request signal to the access logic.

* Event EOADTX (Transmit after End of Access Delay)

This event is said to occur when the access delay time Ta has expired and the transmit buffer of the respective unit was not empty.

* Event TX (Frame to Transmit)

This event is said to occur when the channel is idle and a transition of TB(t) from 0 to 1 is taking place.

* Event FTX (Forced Transmit)

This event is said to occur when a station with high transmit priority (such as a keyboard) is ignoring the busy channel and enforces the transmission of a packet. Because of the characteristics of the IR channel and the receiver circuitry, and the close proximity of the two involved devices (system unit with allocated keyboard) resulting in a strong signal for the receiving device, it is likely that the packet is received correctly (capturing the channel).

This event may be triggered by a time-out condition in the respective device.

Figure 9:
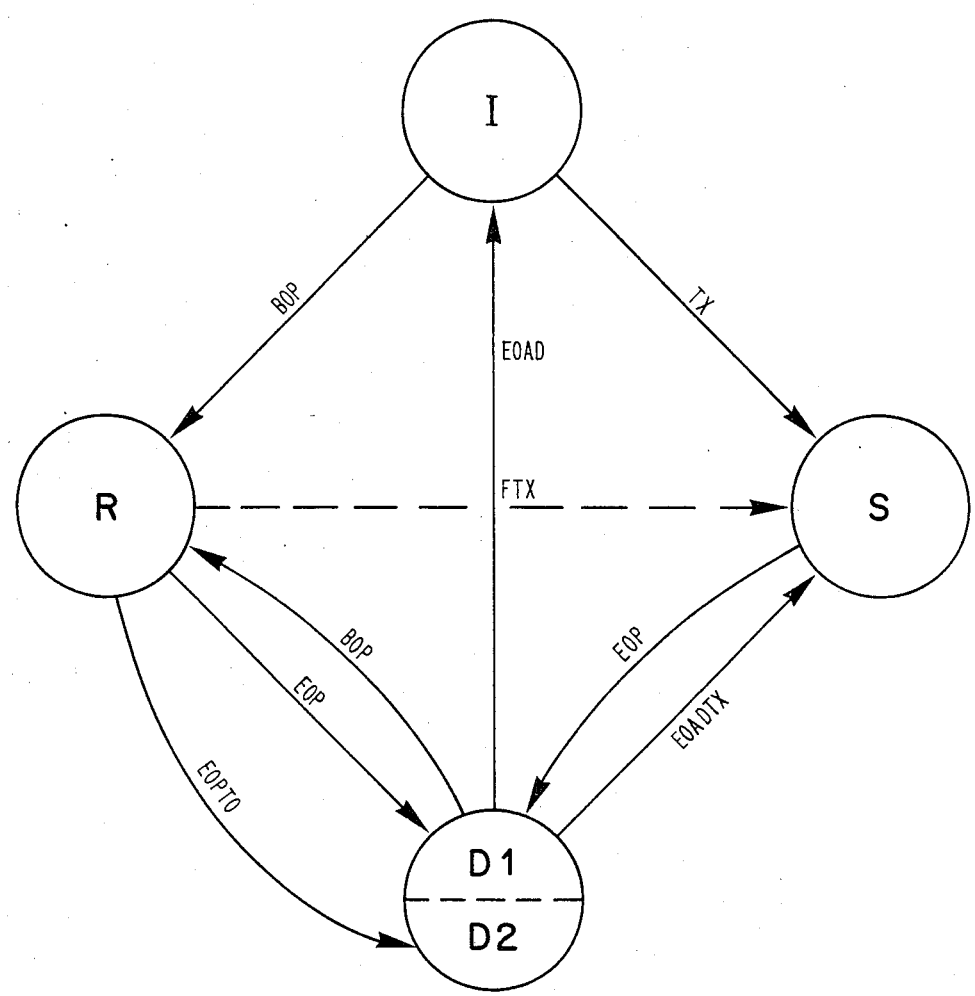
FIG. 9 is a diagram of the different states and transitions that are possible in a transceiver according to the present invention.

In the following, a description is given of the possible state transitions that can occur as seen from a single transceiver. The state diagram as seen from a transceiver point-of-view is shown in FIG. 9. Note that the "transmit" state (that was defined for the IR channel) is not split up into two different states "R" and "S" depending on whether the particular transceiver is either listening/receiving or sending. The time sequence of events is shown in FIG. 8, and a flowchart representation of the access protocol is given in FIG. 10.

Assume that the transceiver is in the idle state "I". If the carrier detector 47 responds to a preamble by setting CS latch 53, indicating the value of the Boolean carrier sense function to be C(t)=1, the idle state is left for the receiving state "R". This represents the begin of a packet, BOP. At this time a counter is also loaded with a To count (To=Tpmax). Note that for the length of the interval during which C(t)=1, Manchester decoder/encoder 45 remains enabled. CS latch 53 will only be reset when the end of a packet (EOP) is indicated, thus serving as a new time reference for synchronizing the access slots, or when a time-out EOPTO occurs.

The receive state "R" can be left for the defer state "D" (either D1 or D2) in two different situations:

If the received signal quality (signal-to-noise ratio) is good the Manchester decoder 45 will acquire synchronization after the preamble and start delimiter. This event SDEL will reload a timing counter with the time-out count To. The detection of the end of the packet (EOP) will serve as a new time reference for synchronizing the access slots. The receive state "R" is now left for the defer state D1 and a counter is loaded with the guard time Tg.

If the received signal quality is poor (between D-boundary and C-boundary, c.f. FIG. 4), Manchester decoder 45 may not acquire synchronization or will loose it and may not be able to detect the end of the packet (EOP). In this case the receive state can only be left when the time-out EOPTO occurs. The new time reference is the time-out EOPTO. Note that while the receiving or listening transceiver is in the receive state "R" the detection of a new start delimiter (SDEL) will reload a counter with the time-out value To and keep the Manchester encoder enabled for at least one other maximum packet length. This mechanism prevents the Manchester decoder from becoming disabled due to a time-out condition when in progress of receiving a subsequent packet.

For devices requiring fast access times such as keyboards, joysticks, or touch panels a forced transmit mode FTX is provided. If these devices have to wait too long for a chance to transmit a packet due to a heavily loaded channel, a time-out in a higher level protocol layer can force an exit from the receiving state "R" directly to the send state "S". This option is reserved for pairs or groups of terminals located closely together and having a low LED optical power rating. Due to the close distance the resulting signal-to-noise ratio is high and the chance of capturing the channel in the presence of another packet is also high, even without causing destructive interference at the receiving station of the other packet (if it is not just one of the closely located terminals).

On entering the defer state "D" (D1) via the EOP event a counter is loaded with the guard time Tg and after time-out, CS latch 53 is reset. This disables the Manchester decoder and renders the CS latch ready for a new carrier sense trigger pulse. At time-out of Tg a counter is loaded with the calculated delay count Ta.

On entering the defer state "D" (D2) via the EOPTO event CS latch 53 is reset immediately and the guard time count Tg is loaded. This procedure gives the carrier detector more time to respond to the presence of a carrier. Note that in this situation a transmission may be already in progress and the carrier detector has to respond to the Manchester coded data and not to the preamble signal to which the carrier sense bandpass filter 49 is tuned. The spectral energy matching the carrier sense filter is highest for a preamble (as defined in section 2.1), and least for the data bit sequence 10101010 . . . . Hence the response time for the carrier detector depends on the current data pattern and may be longer than for detecting a preamble directly. For this purpose the CS latch is reset at the EOPTO event already, giving the carrier detector more time to respond. After this the procedure for the access delay is the same as for the EOP event.

If during the access delay, i.e., before the time-out of Ta occurs, a carrier is sensed, CS latch 53 is set again, and this event BOP causes a transition from defer state "D" back to receiving state "R". If the time-out of Ta occurs before a new carrier preamble is sensed, the following two steps are possible: The defer state "D" is left for the idle state "I" after the access delay has expired, if the transmit buffer was empty (EOAD). On the other hand, the defer state is left for the send state "S" when the access delay expired and the transmit buffer was not empty (EOADTX).

A transition to the send state "S" can occur in two different situations. One was just mentioned, i.e. if in the defer state the access delay expires and the transmit buffer is not empty (TB(t)=1). The other situation is if in the idle state "I" the transmit buffer receives data, i.e. if TB(t) goes from 0 to 1 (event TX).

There is no exit from the send state "S" until the transmission is completed (event EOP). (It is not possible for the transmitting station to detect a collision reliably, because of the strong IR echo reflected back into the receiver of the transmitting device.) After completion of the transmission the sending station goes back to the defer state and only from there to the idle state.

Figure 10:
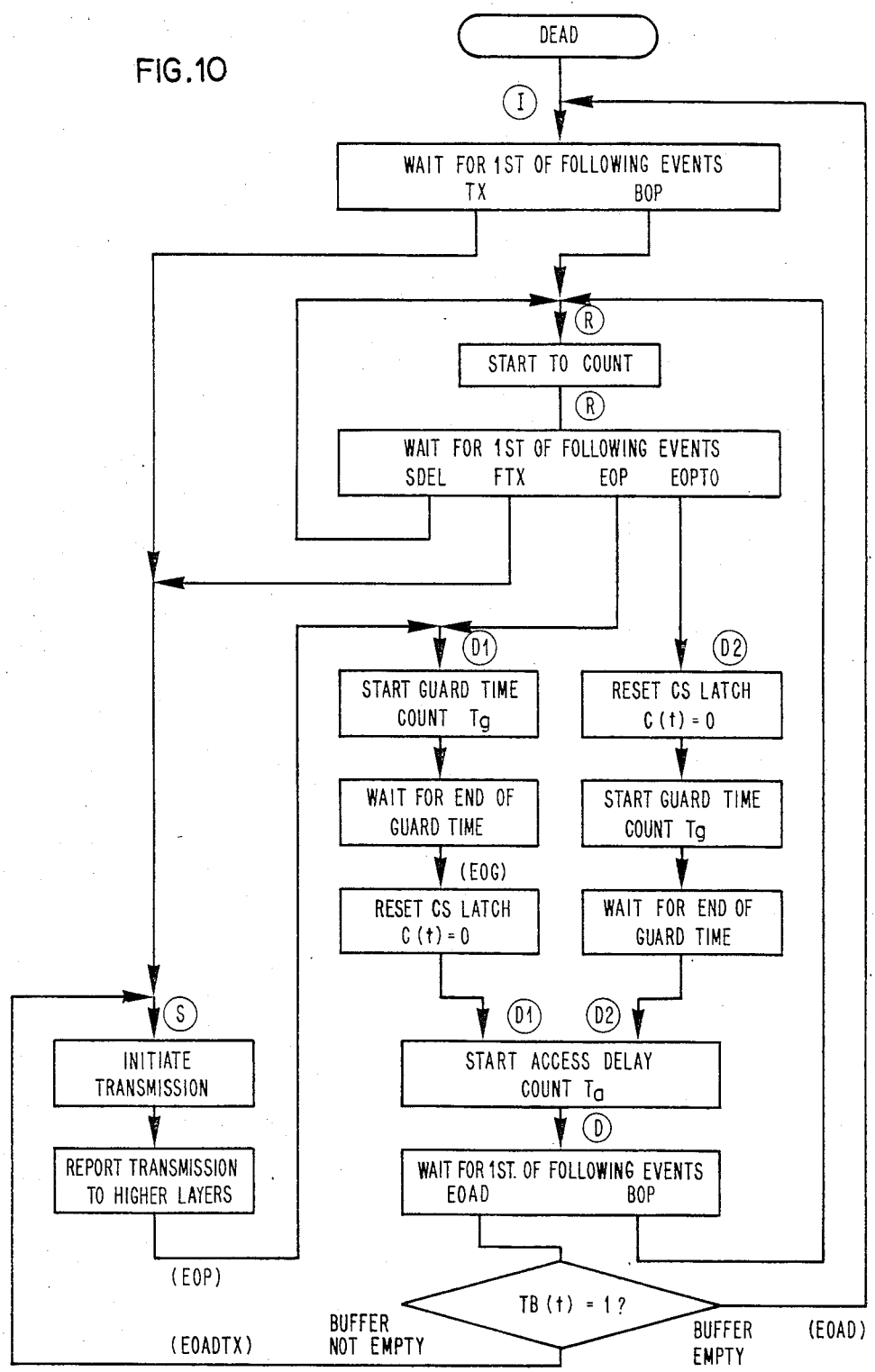
FIG. 10 is a flowchart illustrating the access protocol procedure of the present invention.

FIG. 10 represents a flowchart of the basic protocol procedure described above.

Figure 11:
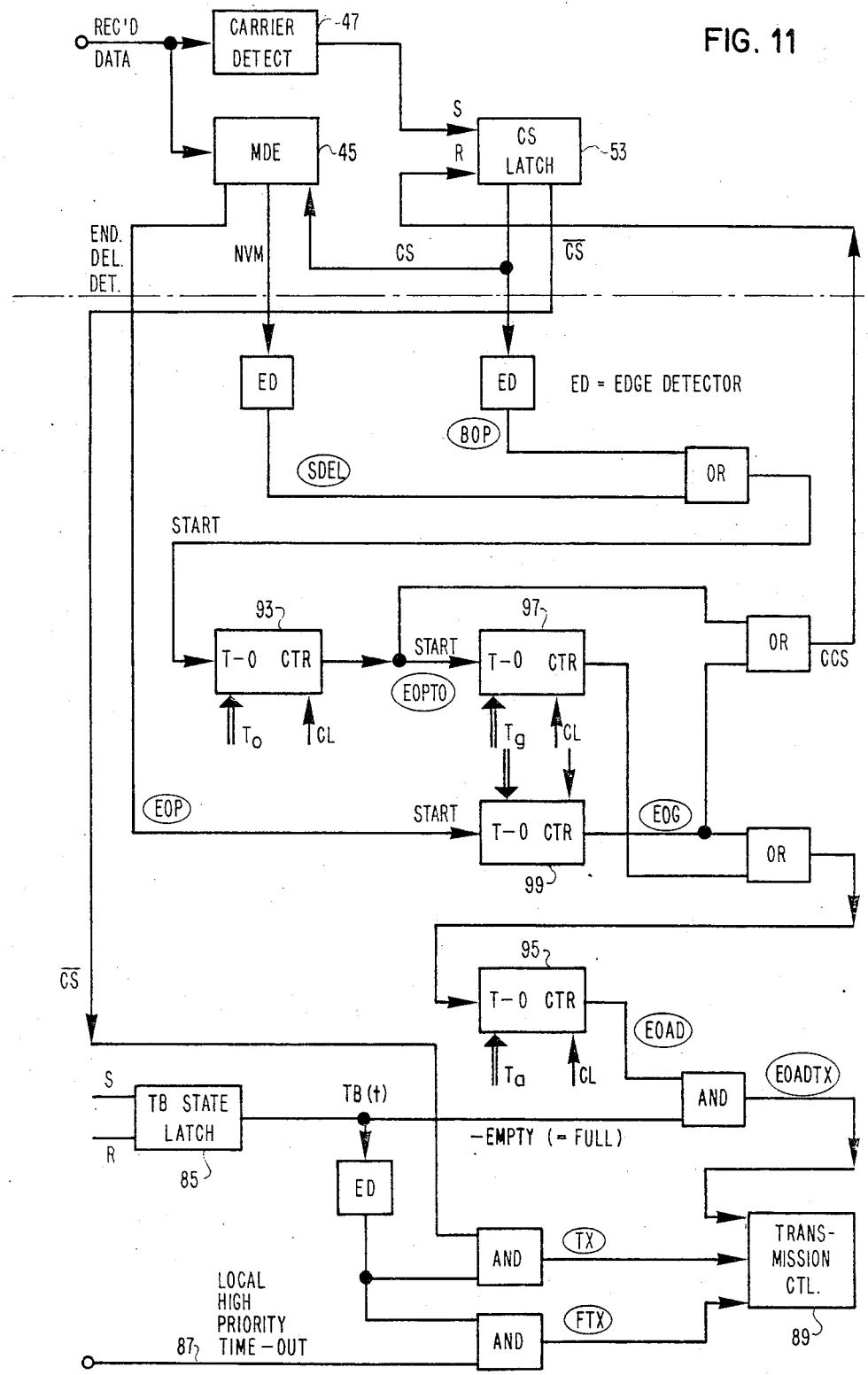
FIG. 11 is a block diagram of logic circuitry embodying the access protocol of the present invention.

FIG. 11 shows a block diagram of logic circuitry that can be provided in a system unit or an I/O device for handling the access protocol. The logic circuitry uses as input signals various output signals of Manchester decoder (MDE) 45 and CS latch 53 which are parts of the transceiver but which are also also in FIG. 11, as well as the TB(t) signal of a transmit buffer sate latch 85, and a signal "high local priority time-out" that is provided on line 87 e.g. in keyboards and other devices that must be served promptly but have low transmission power.

This access protocol logic circuitry furnishes three different transmission enabling signals (EOADTX, TX, FTX) to transmission control circuitry 89 that is provided in the respective device.

The whole arrangement shown in FIG. 11 is better understood with reference to the flow chart of FIG. 10 and the prior descriptions relating thereto.

In the logic circuitry of FIG. 11 four time-out or delay counters 93, 95, 97 and 99 are shown for enabling different delays To, Ta, and Tg, respectively.

Instead of providing the four counters as shown (which are never used simultaneously) one could of course use only a single counter plus additional multiplexing or gating circuitry so that upon occurrence of a particular start signal the correct time-out value (To, Ta, Tg) is loaded, and upon occurrence of the time-out the respective pulse is furnished to the correct AND or OR gate.

Two transceivers that are not within each other's C-boundary can cause an access collision at a third station. n this case the CSMA protocol degrades to an ALOHA-type access protocol. Weak devices local to a workstation suffer most from this situation. The problem can be alleviated by having the transmitters emit a strong carrier burst preceding a low power data frame. This extends the C-boundary of the sender to its N-boundary.

An additional mechanism that reduces access collisions by enforcing proper carrier sensing, involves repeaters. When a repeater encounters a preamble it transmits a short burst carrier of duration Tb (FIG. 8, top left). So, the device's transmission preamble gets sensed not just within the transmitter's C-boundary but even within the much larger C-boundary of the repeater. This prevents stations from gaining interfering access. However, if carrier enforce bursts are provided the preamble must be sufficiently long to allow the carrier enforce burst signal to decay to the normal received signal level before the end of the preamble, to ensure proper decoding of the subsequent data stream.

In a mixed media system, the access method described in this section and the packet format described in the preceding section can also be used for transmissions on the cable-bound medium, with the following exceptions: The features carrier sense burst, repeater enabling, and different LED transmitter power levels are disabled by setting bit 4 of the MODE control bits to one.

At least one repeater can be added to the network to increase the overall transmission range or to provide multiple and spatially diverse signal paths to "hidden stations" in a difficult environment (cf. FIG. 1C). It provides a datagram service, i.e. it repeats remote traffic on a best effort basis without invoking the data link layer (error corrections). In order to avoid overloading the network with repeater traffic the maximum number of repeaters should be limited to four.

To avoid unnecessary circulation of duplicate packets and to exclude delayed arrival of packets with ambiguous sequence numbers when using the IBM SDLC (Synchronous Data Link Control) protocol, repeaters have to adhere to the following rules:

Each repeater can buffer only one packet of maximum length.

Incoming packets are discarded if the buffer is not free.

A repeater discards a frame if its enable bit (REPx-EN bit) is not set.

A sending station can enable specific repeaters. Normally, all repeaters support forwarding this frame and the packet is receivable at all stations on the IR network. If all repeater enable bits are zero no repeater forwards the frame. This is intended for traffic local to a station.

A repeater discards a frame received with incorrect checksum.

A repeater keeps the checksum of the last frame transmitted for a given time interval. During that time interval it discards all newly arriving frames having an identical checksum.

If access to the IR channel is not granted to the repeater within the period of 4 maximum length frames, then the packet is discarded.

While we have illustrated and described a preferred embodiment of our invention, it is to be understood that we do not limit ourselves to the precise constructions herein disclosed and hereby reserve rights to all changes and modifications thereof within the scope of the following claims.

What we claim is:

1. System for interconnecting a plurality of data handling units by infrared signals over a common infrared communication channel, said units including a plurality of stations and associated I/O devices, each said unit comprising at least one infrared transceiver and accessing the common infrared communication channel only in dependence of carrier sense function, characterized in that each said transceiver is assigned to one of a plurality of hierarchical categories according to its required distance range of coverage within said system, and each transceiver includes means for establishing its infrared transmitting power and/or receiving sensitivity at magnitude(s) uniquely corresponding to its hierarchical category.

2. A system according to claim 1, characterized in that at least one repeater unit is provided for retransmitting received data packets to increase the covered distance range, and that the transceivers for all repeater units are assigned to the category having the highest magnitude transmitting power and receiving sensitivity and include means establishing such highest magnitudes.

3. A system according to claim 1 or 2, characterized in that the transceivers of each category have a specific number of light emitting diodes and a specific number of photodiodes thus determining the transmitting power and receiving sensitivity, respectively, of each transceiver of the respective category with transceivers of a category corresponding to a greater coverage range having more light emitting diodes and photodiodes than transceivers of categories corresponding to lesser coverage ranges.

4. A system according to claim 1 or 2, characterized in that in at least one of said transceivers is assigned to plural hierarchical categories and includes means for establishing sets of magnitudes of transmitting power and/or receiving sensitivity for each category and means for activating magnitudes as sets according to a control signal indicative of any one of said plural hierarchical categories, one of a plural number of different magnitudes of transmitting power and/or receiving sensitivity can be selected by a respective control signal.

5. A system according to claim 2, characterized in that each repeater comprises means for transmitting a short carrier enforce burst of a duration (Tb) shorter than a preamble signal duration (Tpr), said preamble signal transmittable by each said unit, after detecting said preamble signal.

6. A system according to claim 1, characterized in that each said unit comprises means for transmitting data in frames in the form of packets comprising a data field, at least one address field, and a control field comprising a plurality of mode bits for selectively enabling either one individual unit or a predetermined related group of units to receive a respective packet.

7. A system according to claim 1, characterized in that each unit comprises means for inhibiting transmission as soon as an infrared carrier preamble or data signal is detected; means for starting a first time-out cycle of given duration (To) when a carrier preamble or data signal is detected (BOP); means for detecting an end-of-transmission indication (EOP); means for starting a second time-out cycle of a duration (Ta) individual to the respective unit either after detection of an end-of-transmission indication (EOP) or after the end of the first time-out cycle (EOPTO) whichever occurs first; and means for enabling a transmission in response to the end indication of said second time-out cycle (EOAD) if no infrared carrier preamble or data signal was received in the meantime.

8. A system according to claim 7, characterized in that additional means are provided in each unit for starting a third time-out cycle (Tg) immediately either at the end of said first time-out cycle (EOPTO) or upon detection of an end-of-transmission indication (EOP), and that said means for starting the second time-out cycle (Ta) is responsive to an end indication (EOG) of said third time-out cycle, so that in each unit a guard time (Tg) is obtained during which no transmission is possible.

9. A system in accordance with claim 1, characterized in that at least one of said data transmitting and receiving units comprises transceiver means connecting it to a subnetwork including other data transmitting and/or receiving units which are interconnected by electrical or optical cables, and that each of said units interconnected by infrared signals and each of said other units interconnected by cables, comprises means for inhibiting transmission as soon as carrier preamble or data signal is detected; means for starting a first time-out cycle of given duration (To) when a carrier preamble or data signal is detected (BOP); means for detecting an end-of-transmission indication (EOP); means for starting a second time-out cycle of a duration (Ta) individual to the respective unit either after detection of an end-of-transmission indication (EOP) or after the end of the first time-out cycle (EOPTO) whichever occurs first; and means for enabling a transmission in response to the end indication of said second time-out cycle (EOAD) if no carrier preamble or data signal was received in the meantime.

10. A system for interconnecting data transmitting and receiving units including a plurality of stations and associated I/O devices and at least one repeater unit, by infrared signals, information being transmitted in the form of packet frames comprising at least one address field and a control information field, characterized in that
said control information field comprises plural mode control bits each having a state for identifying one of said units individually or for identifying a group of said units having the same function in the system, and that
activating means are provided in each said unit for activating an identified unit to accept or to retransmit a received packet frame upon detecting the mode control bit state corresponding to such unit only if that unit is selected by an assigned mode control bit in the respective frame.

11. A system according to claim 10, characterized in that each said unit comprises at least one infrared transceiver, and that each transceiver belongs to one of a limited number of hierarchical categories corresponding individually to required distance covering ranges each having different transmitting power and receiving sensitivity, according to the required distance covering range of the transceivers for the respective category.

12. A method of transmitting data signals in a system comprising units which include stations and devices assigned to said stations, in which any individual such unit accesses a common transmission medium only in dependence of a carrier sense function for transmitting data in the form of packets, comprising the steps of:
sensing a signal transmission by said unit;
driving said unit to a non-transmit state;
starting a time-out cycle of a duration (To) at least equal to the longest packet transmission time (Tpmax) in said unit;
detecting either and end-of-transmission delimiter (EOP) or the end of a time-out cycle (EOPTO) by said unit;
starting a data transmission in a time slot assigned to said unit in the event no signal transmission is detected by said unit prior to initiation of data transmission by said unit.

13. A method of transmitting data by infrared signals in a system comprising a plurality of units including transmitters, receivers and stations, and devices assigned to said stations, in which system any unit accesses a common infrared transmission channel only in dependence of a carrier sense function for transmitting data in the form of packets, comprising the steps of:
operating said transmitters and receivers with different transmitting powers and receiving sensitivities, respectively, depending on the required distance range to be covered;
sensing an infrared signal transmission by each said unit;
driving each said unit to a non-transmit state;
starting a time-out cycle of a duration (To) at least equal to the longest possible packet transmission time (Tpmax) in each said unit;
detecting either an end-of-transmission delimiter (EOP) or the end of said time-out cycle (EOPTO) whichever comes first, in each said unit;
transmitting data in a time slot assigned to a corresponding unit in the event no infrared signal transmission is detected by said correspondence unit prior to initiation of data transmission by said corresponding unit.

14. The method according to claim 13, further comprising the step of:
transmitting a preamble of rectangular pulses representing the carrier of the signal prior to transmitting a data packet, at a higher signal power than subsequent data in said data packet.

15. The method according to claim 13, wherein said step of transmitting further comprises the step of:
transmitting said data packets in the form of frames and selectively activating said units with mode bits contained in a control field of each said frame.

16. The method according to claim 13, further comprising subsequent to said step of detecting an end-of-transmission delimiter (EOP) or the end of a time-out cycle (EOPTO), the steps of:
starting a second time-out cycle representing a guard time (Tg) in each said unit to allow said receivers to settle to equilibrium;
starting a third time-out cycle of a duration (Ta) which is individually selected in each respective unit, subsequent to said second time-out cycle; and
leaving the non-transmit state for each respective unit, upon the occurrence of an indication of the end (EOAD) of the third time-out cycle.

17. The method according to claim 13, further comprising subsequent to said step of transmitting a data packet of given duration (Tp), the step of:
inhibiting any data transmission by each said unit for a period at least equal to said transmitted packet duration (Tp), whereby the duty cycle of each respective transmitter is reduced from the total possible transmission time to allow cooling of light emitting diodes between transmissions.

* * * * *